Aug. 13, 1968     A. E. McCORRY     3,397,297
INDUCTION HEATING APPARATUS
Filed Feb. 24, 1966
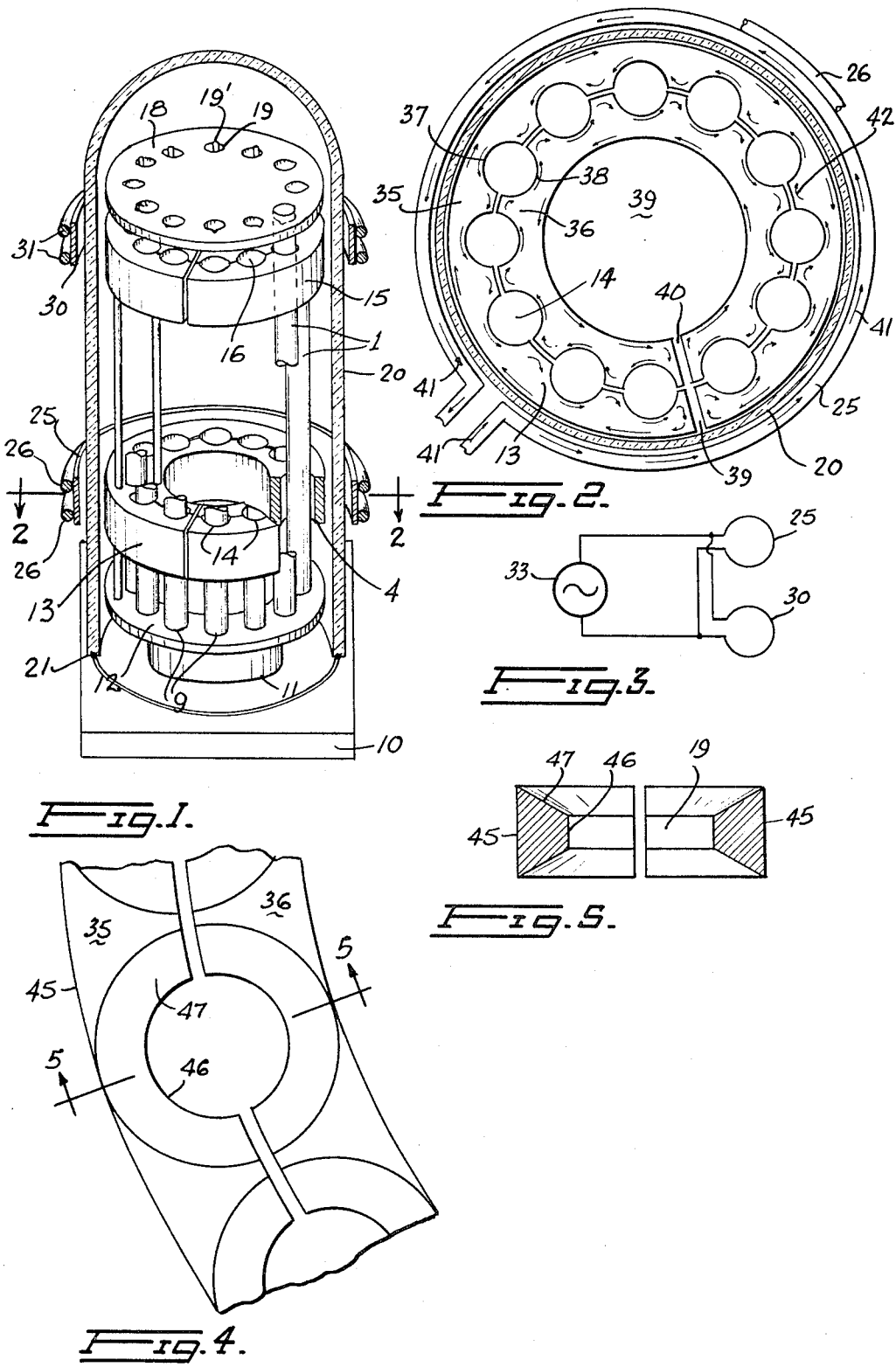

United States Patent Office 3,397,297
Patented Aug. 13, 1968

3,397,297
INDUCTION HEATING APPARATUS
Arthur E. McCorry, Port Hope, Ontario, Canada, assignor to Atomic Energy of Canada Limited, Ottawa, Ontario, Canada, a corporation of Canada
Filed Feb. 24, 1966, Ser. No. 529,855
5 Claims. (Cl. 219—10.69)

ABSTRACT OF THE DISCLOSURE

An induction heating apparatus is described which consists of a primary winding for connection to a high frequency alternating current source and within which winding is arranged a susceptor consisting of two rings each defining a set of half coves for cooperating with the half coves in the other ring, and within which coves workpieces to be heated can be inserted. Each ring includes a radial split to allow induced current passage along its circumferential surfaces and around the coves.

---

This application relates to induction heating apparatus and has particular reference to a device for induction brazing a multitude of joints simultaneously.

The apparatus of the invention finds particular, though by no means exclusive, utility in joining wear pads or spacers to the sheathings of fuel elements for use in nuclear reactors. Typically such sheaths are tubes of a metal such as Zircaloy.

In the past it has been difficult to fix spacer or wear pads to a Zircaloy tubing in an economical manner such as by brazing or welding because the alloy is attacked by atmospheric oxygen when heated. The joining must be done therefore either in vacuum or in an inert atmosphere. It has been possible to apply wear pads by induction brazing to a single tube. Such brazing generally involves placing the tube in an electrically insulated container, developing a vacuum or introducing an inert gas, and heating the local area to be joined using an external induction coil. This process though effective is extremely time consuming since each tube normally has at least two wear pads, and a large number of these are required.

In accordance with the teaching of the present invention it has now become possible to affix wear pads to a multitude of tubes simultaneously so that the necessary number of tubes can be treated in one single brazing operation.

A description of the invention now follows and reference will be made to the accompanying drawings in which:

FIGURE 1 shows a perspective view partly sectioned, of the brazing apparatus, and FIGURE 2 shows a section along line 2—2 of FIGURE 1, FIGURE 3 shows a diagram of a circuit for energizing the primary windings of FIGURES 1 and 2, FIGURE 4 shows a plan view of an alternative susceptor, FIGURE 5 shows a section along line 5—5 of FIGURE 4.

Wear pads are initially prepared for fixing to tubes by punching metallic pieces of the correct size from sheet stock with the braze alloy attached to it. The anvil of the punch is so shaped that the pieces are formed with a cylindrical surface so that they will fit the tubing surface. The finished pads are then tack welded at the appropriate places on these tubes.

Having reference now to FIGURE 1, a typical tube 1 has a pair of wear pads 4 tack welded to it. It is then placed alongside other tubes in the machine shown in FIGURE 1. This machine comprises a base table 10 upon which is mounted a supporting pedestal 11. The pedestal includes a shelf 12 having inlet holes 9 within which can be supported the tubes 1. The tubes 1 are arranged vertically and pass through a susceptor coil 13 which is perforated at 14 to accommodate them. A second susceptor coil 15 arranged above the first also allows the tubes to pass through holes 16 defined in it. The upper ends of the tubes are located by insulating disc 18 perforated at 19 to accommodate them. The holes 19 include relieved portions 19' so that the tacked wear pads will not foul the plate as the tubes are slipped into position.

When the tubes have been loaded into position, the assembly is covered by a glass or other suitable atmosphere excluding magnetically and electrically insulating cover 20 which rests on the supporting table 10, to which it is sealed in conventional manner such as by O-ring 21. Immediately outside the cover 20, but adjacent the susceptor coil 13, is a single turn primary strip conductor 25 which can be driven from a source of high frequency (radio frequency) alternating current at low impedance. The primary strip 25 is cooled by water conduits 26. A similar primary strip 30 is arranged adjacent to the upper susceptor coil 15 and is cooled by water conduits 31. The two primary windings may either be connected in parallel or in series across the source of high frequency current, depending upon the output impedance of the source. A typical parallel circuit is sketched in FIGURE 3 with generating source 33.

Referring now to FIGURE 2, an embodiment of one of the susceptors is shown in a form which has been found to be particularly satisfactory. The susceptor 13 is divided into inner and outer rings 35 and 36 respectively, and forms the series of holes 14 by cooperation of the inner coves 37 on ring 35, and outer coves 38 on ring 36. Each ring is split radially at 39 and 40 respectively.

Let us now consider the instant when current is increasing in the direction shown by arrows 41 for primary strip 25. Since the susceptor rings 35 and 36 are in the magnetic field produced by the primary conductor strip 25, currents indicated by arrows 42 will be set up in the two susceptor rings tending to oppose the direction of change of the current in primary 25. Because the magnetic field is changing at a very high rate (being radio-frequencies) there will be little penetration of field into the conducting rings 35 and 36, and the currents will flow along the surfaces of the susceptors as shown by the arrows. The radial slits 39 and 40 complete the circuit for the flow of current along the surface edges of the susceptors. These currents distort the field produced by the primary conductors, which becomes concentrated into the holes 14. Resistive electrical conductors are present in these holes, being the tubing and the wear pads which are to be brazed onto them, and strong local heating in them occurs. The tube, being a single turn resistive load, is heated uniformly about its circumference.

The actual temperature to which the workpiece is raised can be varied by control of the power input to the primary 25, the coupling between the susceptor rings 35 and 36, the coupling between the workpiece and the susceptor, the length of time the power is supplied, and the frequency of the current in the primary. Thus by varying the spacing between the susceptors 35 and 36, the intensity of the field in the holes 14 will change. Similarly a larger hole 14 for a small tube will produce less heat in that tube than will a smaller hole.

The susceptor 15 is similarly constructed to susceptor 13. Thus after the tubes have been placed in position with the wear pads tack welded onto them, and the hood 20 also been positioned, the space within the hood is either evacuated (such as through a valve in the base 10), or an inert gas is passed into the hood to flush out the atmospheric oxygen. The current to primaries 25 and 30 is then switched on and heating begins. In one particular embodiment it was found that by energizing the primary windings 25 and 30, with current from a 1 mc./s. source, a brazing cycle time of 17 seconds was all that was required to affix 24 wear pads to twelve tubes.

If it is desired to concentrate the heating on the surface of the tubing even more, the susceptors may be modified as shown in FIGURES 4 and 5. Here the thickness of the susceptors is progressively reduced as the edge adjacent the workpiece is approached. The thick edge 45 at the edges of the susceptors furthest from the workpiece carries the same current as the edge 46 adjacent the workpiece. The current density is therefore greater along the edges 46 than edges 45 and the field produced by the primary winding is therefore more concentrated in the hole 14 adjacent to the edges 46.

One advantage of this invention is that if it is desired to fix more than two wear pads to a tube, a new susceptor with its cooperating primary winding may be introduced at each desired longitudinal position of the tube. Each new susceptor would be split in a similar manner to susceptors 13 and 15 and would have its own primary winding and cooling coils if need be. It will be understood that by shaping the susceptors in the manner explained for FIGURES 4 and 5, variations of heating pattern can be provided. Thus for some purposes it may be desirable to increase the heating for only certain of the holes through the susceptor, or alternatively to ensure that some parts of the hole allow greater heating than other parts. Thus the edges 46 (FIGURE 5) may be made thin in areas adjacent to the wear pads, but allowed to remain of the original thickness of side 45 in regions remote from the wear pads.

I claim:

1. Apparatus for induction heating a multitude of individual workpieces which comprises, a primary electromagnetic induction winding, means for connecting said winding to a high frequency alternating current source, an electrically conducting susceptor within said winding for directing magnetic field induced within said winding, said susceptor comprising a first susceptor ring adjacent said winding, said first ring being split radially for allowing induced current passage along its circumferential surfaces, formed edges to said first susceptor ring defining a plurality of coves, a second susceptor ring within said first ring and having formed edges defining a second plurality of coves cooperating with said first mentioned coves, said second susceptor ring being split radially for allowing induced current passage along its circumferential surfaces, current around said coves thereby directing flux through the spaces defined by said coves and heating workpieces placed within said spaces.

2. Apparatus as defined in claim 1 comprising, a second said susceptor, and a second co-operating primary winding displaced from said first susceptor and winding, elongated workpieces passing through and being heated in the spaces defined by said first and second susceptors.

3. Apparatus as defined in claim 1, parts of said cove defining edges of said susceptor rings being reduced in thickness for local concentration of flux from said primary winding in said spaces.

4. Apparatus as defined in claim 1 comprising, magnetically electrically insulating atmosphere excluding means, for enclosing said susceptors and said workpieces, between said susceptors and said primary winding.

5. Apparatus as defined in claim 2 comprising means for connecting said first and second primary windings to said high frequency electromagnetic current source.

References Cited
UNITED STATES PATENTS

| | | | |
|---|---|---|---|
| 2,353,130 | 7/1944 | Dravneek | 219—10.79 |
| 2,442,968 | 6/1948 | Bierwirth | 219—10.79 X |
| 2,709,741 | 5/1955 | Albrecht | 219—10.79 |

RICHARD M. WOOD, *Primary Examiner.*

L. H. BENDER, *Assistant Examiner.*